Patented Mar. 2, 1948

2,436,818

UNITED STATES PATENT OFFICE 2,436,818

COSMETIC PREPARATIONS

Sidney Musher, New York, N. Y., assignor to Musher Foundation Incorporated, New York, N. Y., a corporation of New York No Drawing. Application May 11, 1945, Serial No. 593,324

10 Claims. (Cl. 167—91)

The present invention relates to the production of unusual cosmetic preparations and particularly where the cosmetic preparations are used in aqueous suspension or for application to the skin where a combination of adhesiveness, gum formation and mild bleaching effect and covering power is desired.

It has been customary in the past to employ oatmeal or oat flour (made by grinding oat groats) in the production of various types of cosmetic preparations but these cosmetic preparations have not met with wide acceptance because they do not possess the combination of desirable characteristics of adhesiveness, high viscosity, covering power, mild bleaching action and gummy effect.

Furthermore it has been customary in the manufacture of cosmetics to use a wide variety of gums and physical stabilizers such as gelatin, sodium alginate, algin, pectin, Irish moss, gum tragacanth and similar materials which are not only quite expensive but which do not serve a variety of purposes in the finished cosmetic preparation. These various gums and stabilizers merely give a gum effect and even then the gum effect is not in all cases wholly satisfactory where a full measure of adhesiveness to the skin is desired. It is then necessary to include other materials to give such other characteristics as lubrication, mild bleaching effect, covering power, and yet using a pure edible food product in the preparation of the cosmetic material.

An object of the present invention is therefore to provide a cosmetic preparation which possesses the combination of desirable characteristics of adhesiveness, high viscosity, covering power, mild bleaching action and gum effect.

Another object is to provide these advantages by economical and readily available means.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that when a certain fraction of oats has been properly separated from the oat grain and finely divided it may be incorporated as an ingredient and stabilizer in a cosmetic preparation such as in hand lotions, dentifrices, bath preparations, and the like to give desirable physical and other characteristics, good viscosity, adhesiveness, covering power and gum-like effect.

These unusual properties are not to be found in the oat grain as a whole or in ordinary oat products as, for example, in oat flour made by grinding oat groats or in pulversized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special stabilizer desired the groats are pulverized to such an extent that at least 50% and desirably 80% to 90% will pass through a screen or mesh or bolting cloth having a fineness in excess of about 60 mesh and desirably having a fineness in excess of 70 mesh.

The ground groats are then separated as by aspirating or screening into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and most desirably between 80% and 90% of the total weight of the ground oat groats.

The coarse residue which is left after such grinding and screening or bolting or after aspirating is then finely divided and is found to contain the properties most desirable for incorporation in cosmetic preparations, the desired effect being most particularly observed after the coarse fraction has all been ground to a fineness of at least 50 mesh and most desirably to at least 60 mesh.

This effect is not evident or evidenced when the whole oats are ground and utilized as such or when the oat flour made by grinding oat groats is utilized as such because of the fact that other constituents therein render ineffective the unusual stabilizing or gummy properties of the ground, relatively high protein and relatively low starch containing dehulled oat fraction of the present invention. The unusual stabilizing or gummy properties described herein are obtainable only by the use of the novel oat product of the present invention, which novel oat product is obtained in accordance with the procedures outlined herein.

In the preferred procedure the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction behind desirably to be ground to at least 60 mesh for use in accordance with the procedures of the present invention.

The coarse fraction obtained should desirably have a protein content of at least about 20% and more desirably in excess of 22%. At the same time the starch content of the coarse fraction will be reduced to much less than the starch content of the fine fraction.

According to one method of separating the relatively high starch fraction which is necessary to obtain the unusual properties in most highly developed condition, the groats are ground so that a major proportion thereof, say at least 50% to 80%, will have a fineness in excess of about 60 mesh and desirably at least 60% to 70% of the ground material will have a sufficient fineness to go through about a 90 mesh screen.

Then the ground material is screened, preferably through a fine silk screen or aspirated to remove all particles which will not go through a 60 mesh screen.

A most highly desirable method is to grind the oat groats until over 75%, and desirably between 80% and 90% will go through a 70 mesh screen but wherein the balance of between 10% and 20% remains on the screen. Then the ground oats are aspirated or screened to remove all the coarse particles and to separate the fine fraction comprising 80% to 90% from the coarse fraction comprising the balance of 10% to 20%. The oat material which goes through the screen or the fine material which is aspirated will contain the relatively high starch fraction whereas the material left behind on the screen or the coarse fraction thereof will be relatively low in starch content.

This coarse, relatively low starch and relatively high protein material is then ground or pulverized such as in a hammer or stone or attrition mill to a particle size of at least about 50 mesh and more desirably so that all the ground coarse particles will now go through a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

After the special oat fraction has been removed and desirably finely divided from each total batch that is made the entire quantity may be blended or thoroughly mixed in order to assure obtaining a perfectly uniform product which will produce in a uniform degree the desirable results of the present invention.

This material although very different in composition, quality and chemical structure from gelatin, sodium alginate, algin, pectin, Irish moss and psyllium seed, when added to a cosmetic preparation or when used in the manufacture of cosmetic preparations results in giving such cosmetic preparation unusually desirable characteristics.

Moreover, the stabilizing action given by this particular fraction of oats is given by neither the oat flour produced by grinding oat groats nor by starch.

Moreover, the product prepared in accordance with the present invention has not been found replaceable by any other fraction of oats, or by any other type of cereal or its fractions, including wheat or its fractions, corn or its fractions, barley or its fractions, rye or its fractions, rice or its fractions, or other types of cereals which the applicant has carefully studied.

Although the chemical composition may vary it has been found that at least about 20% protein should be present and most desirably 22% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

By the term "dry milled oat product" as used in the present application and claims is meant an oat product which has been subjected to either grinding, screening, bolting, aspirating or combinations thereof or even to oil solvent extraction but wherein the oat product has been processed in the substantial absence of water or water soluble solvents.

The special oat fraction of the present invention is desirably used in a small proportion in the manufacture of cosmetic preparations such as in the amount of between 0.3% and 15% where an aqueous suspension such as a hand lotion is made, or in a larger amount such as up to about 40% where a face mask is obtained, or in still larger amounts where a substantially dry cosmetic preparation such as a dentifrice or face powder is manufactured and where the most concentrated desirable characteristics of the special oat fraction of the present invention are to be utilized.

In the preparation of the aqueous lotions such as hand lotions between about 0.5% and 15% by weight and preferably between 2% and 7.5% by weight of the special oat fraction is dispersed in water along with other ingredients of the hand lotion.

The aqueous suspension may be preserved with the usual preservatives such as with 1 part of formaldehyde, butyl p-hydroxybenzoate, methyl p-hydroxybenzoate, furfural, etc., to between each 500 parts to 10,000 parts of the suspension.

After combining the special oat fraction with the aqueous material and desirably with distilled water, the combination may be put through a colloid mill to make the finished product perfectly and completely smooth. There may also be included in such preparation a minor amount, desirably less than 20% and preferably less than 10%, of an alcohol. There may also be included such other materials as witch hazel and emollients such as fats, lanolin, sugars or other sweetening agents including sorbitol syrups, flavoring compositions, glycerine, almond oil, and also products having combined hydrophilic and lipophilic properties such as the polyhydric alcohol esters having a free hydroxyl group and a fatty acid radical, monoglycerides, diglycerides, sorbitan, mono and diglycerides and derivatives thereof, etc.

Up to about 5% glycerine as an emollient may also be employed or combinations of glycerine with rose water, using major amounts of rose water and minor amounts of glycerine.

Where desired, emulsified hand lotions may be produced in which from about 0.5% to 5% of fat or polyhydric glyceryl esters as an emollient are employed and the aromatic materials may include such products as bergamot oil, tincture benzoin, benzaldehyde, clove oil, mace oil, lemon oil, etc. There may also be included such compositions as boric acid, citric acid, triethanolamine, sorbitol stearate, lanolin and similar products.

For example, such lotion may be made of the following ingredients:

| | Parts |
|---|---|
| 1. Glycerin | 5 |
| 2. Lanolin | 0.75 |
| 3. Glycol stearate | 6 |
| 4. Sorbitol syrup | 3 |
| 5. Alcohol | 5 |
| 6. Special oat fraction | 5 |
| 7. Water | 75.25 |
| 8. Preservative and perfume, q. s. | |

Combine 1, 2, 3 and 4 at 90° C. Add ½ of 7. Combine separately 5 and 8. Combine separately 6 with ½ of 7 and agitate. Combine all portions with agitation. Where desired, 0.1 part of sorbitan monolaurate or derivative may be added first to 3. Where a lighter colored product is desired, the special oat fraction may first be substantially fat extracted.

Other simple hand lotions may be prepared comprising merely rose water, glycerine, sorbitol stearate and the unusual oat fraction of the present invention such as in amounts of 80% rose water, 5% sorbitol stearate, 10% glycerine and 5% of the special oat fraction of the present invention with the addition of a preservative such as p-hydroxybenzoate and with other aromatic materials where desired.

These hand lotions have been found highly desirable not only for direct application to the skin in producing a mild bleaching effect, covering power, gum characteristics, etc., but also for the preparation of medicated lotions such as for use where sores or skin eruptions have developed as for prickly heat, minor skin irritations, acne, etc.

Even where the unusual oat fraction is dispersed in water, desirably in amounts of from 5% to 10% and preferably where the dispersion is made at a temperature of about 100° F. to 130° F. followed by application to the skin after allowing the aqueous dispersion to stand for a period of about 30 minutes to 1 hour, it has been found that in connection with "desert sores" and widespread moist eruptions of the skin the unusual oat fraction has a healing and soothing effect upon the skin with a marked reduction in itching and irritation.

The unusual oat fraction is also highly desirable for incorporation with the so-called medicated lotions where calamine, bentonite and zinc oxide are employed and the special oat fraction also in this case may where desired be used with lime water or similar medicated aqueous composition.

In the case of dentifrices, the usual oat fraction may be used with insoluble abrasive agents such as chalk or calcium phosphate with or without glycerine, the unusual oat fraction supplying the binding effect and giving other desirable physical properties. In the preparation of these dentifrices there may be included polishing agents, and sweetening flavors and the special oat fraction will supply binding effect as well as foaming action and therefore may be used in place of the soap commonly employed to supply foaming characteristics. A thickening effect may be obtained by including with the dentifrice, whether it be a tooth paste or tooth powder, a minor amount of alkaline agent such as calcium citrate and there may also be utilized petrolatum oil or mineral oil in very small amounts although the unusual oat fraction does give some lubricating action.

The following are typical examples of dentifrices:

EXAMPLE I.—TOOTH PASTE

| | Parts |
|---|---|
| Milk of magnesia | 22 |
| Magnesium carbonate | 12 |
| Calcium carbonate | 16 |
| Glycerite of starch | 12 |
| Glycerin | 11.5 |
| Mineral oil | 1.5 |
| Saccharin | 0.1 |
| Special oat fraction | 5 |
| Water | 19.9 |
| Preservative, q. s. | |

EXAMPLE II.—TOOTH PASTE

| | Parts |
|---|---|
| Precipitated chalk | 42 |
| Special oat fraction | 10 |
| Wetting agent | 0.75 |
| Saccharin | 0.1 |
| Sodium bicarbonate | 10 |
| Glycerite of starch | 25 |
| Water | 11.15 |
| Mineral oil | 1 |
| Flavor and preservative, q. s. | |

*Procedure for tooth pastes*

Dissolve preservative in water. Combine glycerite, milk of magnesia, glycerin, special oat fraction and water. Dissolve saccharin in the carbonates and add to the other ingredients with agitation. For adjustment of consistency, use water or glycerin. Put through mill; let stand overnight and mill again.

EXAMPLE III.—TOOTH POWDER

| | Parts |
|---|---|
| Precipitated chalk | 40 |
| Dicalcium phosphate | 45.9 |
| Special oat fraction | 4 |
| Wetting agent | 1 |
| Soluble saccharin | 0.1 |
| Sodium bicarbonate | 7 |
| Flavor | 2 |

Disperse flavor and saccharin in part of the chalk. Mix all ingredients thoroughly and grind together so that they will go through at least a 70 to 90 mesh screen.

Where desired, the special oat fraction may be substantially fat extracted to give increased foaming characteristics.

For all of these products the special oat fraction also supplies a mild bleaching effect which is highly desirable for use in hand lotions, for skin treatment or in a dentifrice such as a tooth powder or tooth paste. Such sweetening agents as saccharine, mannitol, sorbitol or sugars may be employed in the production of the tooth powder or tooth paste. There may also be included with this tooth powder or tooth paste precipitated chalk, dicalcium phosphate, wetting agents, saccharine, sodium bicarbonate or flavoring materials with or without sodium benzoate. Milk of magnesia, magnesium carbonate or calcium carbonate may also be included.

For all these products the unusual oat fraction may, where desired, be combined with other gums such as with gelatin, sodium alginate, pectin, Irish moss, etc., although the special oat fraction gives unusually desirable properties without these other binding agents and supplies at the same time the mild bleaching effect, covering power, and the viscosity desired.

The special oat fraction may also be used in the preparation of denture adherent powders, depilatories, or bath preparations. For the depilatories there may be included such materials as china clay, barium sulphate, bentonite, calcium carbonate, glycerine or the glycols, higher fatty alcohols and similar products and there may also be used calcium oxide, magnesium oxide, sugars, talc or titanium oxide.

Where additional bleaching effect is desired beyond the bleaching effect afforded by the special oat fraction, a minor amount of peroxide may be employed so that the basic mixture may be utilized with up to about 50% to 65% or more of a 4% solution of hydrogen peroxide and there may also be used ammonium chloride, citric acid, lemon juice, tincture of benzoin, potassium carbonate and similar products either alone or in combination.

In the preparation of face powders the special oat fraction may be employed although it is particularly desirable to utilize for this purpose a fat extracted special oat fraction whereby the face powder is given improved properties of staying on the skin, covering power, and adhesiveness. In these face powders there may be used such products as zinc and magnesium stearate or palmitate, zinc oxide, titanium oxide and where desired minor amounts of antiseptics such as oxyquinoline sulphate.

The incorporation of the unusual oat fraction in face powders permits the face powder to adhere well to the skin and gives good covering power and also tends to absorb perspiration.

The unusual oat fraction has also been found desirable in the preparation of hair lotions, skin fresheners and hair waving fluids.

In all these products the unusual oat fraction combines cleansing action, toning or freshening effect, protective action, lubrication, high viscosity, mild bleaching effect, and other desirable characteristics.

In the production of cold creams, which for the most part are emulsions of water in oil, the use of the special oat fraction of the present invention is also very desirable, giving the cold cream properties of viscosity, covering power and good effect upon the skin together with a mild bleaching action. In these cold creams there may be employed such emollients as bees wax, petroleum oils, borax, paraffin and glycerine and also aromatic materials.

As an example of a cold cream, the following is given:

| | Parts |
|---|---|
| Beeswax | 9 |
| Mineral oil 65/75 | 47 |
| Water | 29 |
| Borax | 0.5 |
| Paraffin wax 60° C. | 4.5 |
| Spermaceti | 5 |
| Special oat fraction | 5 |
| Perfume, q. s. | |

Melt the oils and waxes. Dissolve borax in water and disperse special oat fraction therein. Combine with agitation. Disperse perfume and homogenize.

Furthermore in the preparation of vanishing creams where stearic acid, potassium hydroxide, glycerine, spermaceti, sodium hydroxide and similar products may be employed, the inclusion of a minor amount, such as up to about 10% to 20% of the unusual oat fraction of the present invention may also very desirably be utilized.

The desirable characteristics of these cosmetic preparations are given to the cosmetic by the unusual oat fraction of the present invention without respect to the pH of the cosmetic as the special oat fraction retains its desirable physical characteristics even within wide ranges of pH such as between pH 2 and pH 10.

Still further and unusual results are obtained by first extracting the special oat fraction of the present invention to render it substantially fat free or with at least 75% of its fat removed.

Among the solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is very readily pulverized to the desired point of at least about 75 mesh and desirably to about 90 mesh.

Particularly where it is desired to utilize the special oat fraction in a finer mesh or where whiteness is desired such as in the case of face powders, the special oat fraction may first be extracted to remove a substantial amount of the fat which it contains. As a result of the fat extraction the special oat fraction has much superior foaming characteristics, develops a higher viscosity, and can be ground more readily to a finer mesh such as up to in excess of 100 mesh.

Where either the special oat fraction or the fat extracted special oat fraction is placed through a colloid mill, the preliminary grinding operation of the oat fraction itself can be avoided, but in any event in order to obtain the desirable results the finished cosmetic must contain the special oat fraction in finely divided form.

There may also where desired be incorporated along with the special oat fraction or the fat extracted special oat fraction minor amounts of mono-glycerides or di-glycerides or minor amounts of polyhydric alcohols in which at least one of the hydroxyl groups is free and in which at least one of the hydroxyl groups is replaced by a fatty acid radical or minor amounts of polyhydric alcohol esters. For example, the special oat fraction may be combined with a mono- or di-glyceride or with such polyhydric alcohol esters as glyceryl-mono-oleate, glyceryl-monostearate, glyceryldistearate, diethylene glycol (mono or di) stearate, diethylene glycol (mono) oleate or any similar ester of a polyhydric alcohol having at least one free hydroxyl group. These combinations are very efficacious where it is desired to incorporate large quantities of air and at the same time retain high viscosity and heavy body.

The above polyhydric alcohol esters may be mixed mechanically with the special oat fraction but preferably a paste or aqueous dispersion is prepared in which the special oat fraction is dispersed in water such as in from 5 to 15 parts of water for each 1 part of the finely divided special oat fraction followed by adding thereto the polyhydric alcohol ester or similar composition, which combination is then placed through a colloid mill or homogenizer to thoroughly disperse the polyhydric alcohol ester therethrough followed preferably by drying as on a drum drier or by tray drying or by similar dehydration to produce a composite mass in which the polyhydric alcohol ester is thoroughly dispersed in and through the special oat fraction.

Whereas normally these polyhydric alcohol esters "oil off" or come to the surface when added to any aqueous composition and thereby present a major difficulty when trying to obtain a uniform dispersion of the esters through the cosmetic, where the polyhydric alcohol ester is first combined with the special oat fraction of the present invention an unusual colloid appears to be formed whereby the polyhydric alcohol ester is uniformly dispersed throughout the cosmetic and remains dispersed therethrough without the oily composition coming to the surface and without "oiling off."

It has furthermore been found that a synergistic effect is obtained on combining the polyhydric alcohol esters with the special oat fraction of the present invention whereby the relative efficiency of the polyhydric alcohol ester is materially increased when combined with the special oat fraction of the present invention over that obtained where the polyhydric alcohol ester is combined with gelatin or similar stabilizer.

The present application is a continuation in part of application, Serial No. 522,833 filed February 17, 1944, entitled "Cosmetic preparations" which is now abandoned and through said application is a continuation in part of application Serial No. 401,967 filed July 11, 1941, and entitled "Water thickening agent" and application Serial No. 510,831 filed November 17, 1943, entitled "Oat product," now Patent No. 2,355,028.

Having described my invention, what I claim is:

1. A skin lotion comprising an emollient consisting of glycerine and a small amount of the finely divided coarse fraction of dehulled oats, said finely divided coarse fraction being substantially free of those particles which will go through a 60 mesh screen when the dehulled oats are ground to a fineness that will permit 80% to 90% thereof to pass through a 60 mesh screen, said fraction in combination with the emollient having a general soothing effect, a high covering power, lubricating properties, a mild bleaching effect and a combined adhesiveness not characteristic of oat flour and oat meal.

2. A cosmetic preparation comprising as one of the ingredients an emollient and as another ingredient a small amount of the finely divided coarse fraction of dehulled oats, said finely divided coarse fraction being substantially free of those particles which will go through a 60 mesh screen when the dehulled oats are ground to a fineness that will permit 80% to 90% thereof to pass through a 60 mesh screen, said fraction in combination with the emollient having a general soothing effect, a high covering power, lubricating properties, a mild bleaching effect and a combined adhesiveness not characteristic of oat flour and oat meal.

3. A cosmetic preparation comprising as one of the ingredients an emollient and as another ingredient a small amount of the finely divided coarse fraction of dehulled oats, said finely divided coarse fraction being substantially free of those particles which will go through a 60 mesh screen when the dehulled oats are ground to a fineness that will permit a major proportion thereof to pass through a 60 mesh screen, said fraction in combination with the emollient having a general soothing effect, a high covering power, lubricating properties, a mild bleaching effect and a combined adhesiveness not characteristic of oat flour and oat meal.

4. A cold cream comprising an emollient consisting of a paraffin oil and a small amount of a finely divided, dry milled oat fraction, said fraction containing in excess of about 20% total protein and said oat fraction having a relatively low starch and a relatively high protein content as compared to dehulled oats, said fraction in combination with the emollient having a general soothing effect, a high covering power, lubricating properties, a mild bleaching effect and a combined adhesiveness not characteristic of oat flour and oat meal.

5. A dentifrice comprising as one of the ingredients an emollient and as another ingredient an amount of a finely divided, dry milled oat fraction, said oat fraction containing in excess of about 20% total protein and said oat fraction having a relatively low starch and a relatively high protein content as compared to dehulled oats, said fraction in combination with the emollient having a general soothing effect, a high covering power, lubricating properties, a mild bleaching effect and a combined adhesiveness not characteristic of oat flour and oat meal.

6. A skin lotion comprising an emollient consisting of glycerine and a small amount of a finely divided, dry milled oat fraction, said oat fraction containing in excess of about 20% total protein and said oat fraction having a relatively low starch and a relatively high protein content as compared to dehulled oats, said fraction in combination with the emollient having a general soothing effect, a high covering power, lubricating properties, a mild bleaching effect and a combined adhesiveness not characteristic of oat flour and oat meal.

7. A cosmetic preparation comprising as one of the ingredients an emollient and as another ingredient a small amount of a finely divided, dry milled oat fraction, said oat fraction containing in excess of about 20% total protein and said oat fraction having a relatively low starch and a relatively high protein content as compared to dehulled oats, said fraction in combination with the emollient having a general soothing effect, a high covering power, lubricating properties, a mild bleaching effect and a combined adhesiveness not characteristic of oat flour and oat meal.

8. A hand lotion comprising 5 parts by weight of glycerine, 0.75 part by weight of lanolin, 6 parts by weight of glycol stearate, 3 parts by weight of sorbitol syrup, 5 parts by weight of alcohol, 75.25 parts by weight of water and 5 parts by weight of the finely divided coarse fraction of dehulled oats, said finely divided coarse fraction being substantially free of those particles which will go through a 60 mesh screen when the dehulled oats are ground to a fineness that will permit 80% to 90% thereof to pass through a 60 mesh screen.

9. A dentifrice comprising 22 parts by weight of milk of magnesia, 12 parts by weight of magnesium carbonate, 16 parts by weight of calcium carbonate, 12 parts by weight of glycerite of starch, 11.5 parts by weight of glycerin, 1.5 parts by weight of mineral oil, 0.1 part by weight of saccharin, 19.9 parts by weight of water and 5 parts by weight of the finely divided coarse fraction of dehulled oats, said finely divided coarse fraction being substantially free of those particles which will go through a 60 mesh screen when the dehulled oats are ground to a fineness that will permit 80% to 90% thereof to pass through a 60 mesh screen.

10. A cold cream comprising 9 parts by weight of beeswax, 47 parts by weight of mineral oil 65/75, 29 parts by weight of water, 0.5 part by weight of borax, 4.5 parts by weight of paraffin wax 60° C., 5 parts by weight of spermaceti, and 5 parts by weight of the finely divided coarse fraction of dehulled oats, said finely divided coarse fraction being substantially free of those particles which will go through a 60 mesh screen when the dehulled oats are ground to a fineness that will permit 80% to 90% thereof to pass through a 60 mesh screen.

SIDNEY MUSHER.

REFERENCES CITED

The following references are of record in the file of this patent:

UNITED STATES PATENTS

| Number | Name | Date |
|---|---|---|
| 693,349 | Fletcher | Feb. 11, 1902 |
| 1,550,026 | Goode | Aug. 10, 1925 |
| 1,576,774 | McGraw | Mar. 10, 1926 |
| 2,355,028 | Musher | Aug. 1, 1944 |
| 2,355,029 | Musher | Aug. 1, 1944 |

FOREIGN PATENTS

| Number | Country | Date |
|---|---|---|
| 4,529 | Great Britain | 1910 |
| 150,459 | Great Britain | Sept. 9, 1920 |
| 214,893 | Great Britain | May 1, 1924 |

OTHER REFERENCES

De Navarre, Chemistry & Manufacture of Cosmetics (1941), pages 215, 290, 291, 296 and 515.